US008923702B2

(12) United States Patent
Wan et al.

(10) Patent No.: US 8,923,702 B2
(45) Date of Patent: Dec. 30, 2014

(54) SIGNAL RECEIVING METHOD BASED ON MICROWAVE PHOTONICS TECHNOLOGIES

(71) Applicant: Huawei Technologies Co., Ltd., Shenzhen (CN)

(72) Inventors: Wentong Wan, Chengdu (CN); Kun Li, Chengdu (CN); Limin Dong, Shenzhen (CN); Yanfu Yang, Shenzhen (CN); Chao Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 13/787,113

(22) Filed: Mar. 6, 2013

(65) Prior Publication Data
US 2013/0183041 A1 Jul. 18, 2013

Related U.S. Application Data

(63) Continuation of application No. PCT/CN2011/073071, filed on Apr. 20, 2011.

(51) Int. Cl.
H04B 10/00 (2013.01)
H04B 10/60 (2013.01)
H04B 1/28 (2006.01)
H04B 10/2575 (2013.01)
H04B 10/90 (2013.01)

(52) U.S. Cl.
CPC .............. *H04B 10/60* (2013.01); *H04B 1/28* (2013.01); *H04B 10/2575* (2013.01); *H04B 10/90* (2013.01)
USPC .............................. 398/115; 398/141; 398/147

(58) Field of Classification Search
CPC .................................................. H04B 10/2575
USPC .......................... 398/115–117, 140–141, 147
See application file for complete search history.

(56) References Cited

U.S. PATENT DOCUMENTS

| 6,246,500 | B1 * | 6/2001 | Ackerman | 398/115 |
|---|---|---|---|---|
| 6,476,957 | B1 * | 11/2002 | Ward et al. | 359/326 |
| 6,549,311 | B1 * | 4/2003 | Hakki et al. | 398/79 |
| 6,618,176 | B2 * | 9/2003 | Alexander et al. | 398/91 |
| 6,697,576 | B1 * | 2/2004 | Rollins et al. | 398/159 |
| 6,731,922 | B1 * | 5/2004 | Strutz et al. | 455/302 |
| 7,003,231 | B2 * | 2/2006 | Way et al. | 398/186 |
| 7,079,780 | B1 * | 7/2006 | Rollins | 398/198 |

(Continued)

FOREIGN PATENT DOCUMENTS

| CN | 101860400 A | 10/2010 |
|---|---|---|
| EP | 2237454 A1 | 10/2010 |

OTHER PUBLICATIONS

Extended European Search Report issued in corresponding European Patent Application No. 11750208.8, mailed Aug. 22, 2012.

(Continued)

*Primary Examiner* — Agustin Bello
(74) *Attorney, Agent, or Firm* — Brinks Gilson & Lione

(57) ABSTRACT

A microwave photonics based signal receiving device includes a signal generation module, a first Mach-Zehnder modulator, a dispersion module, a second Mach-Zehnder modulator, and a signal conversion module. The signal receiving device simplifies a structure of the signal receiving device by adopting quadrature demodulation. The signal receiving device demodulates a high-order modulation signal and flexibly adjusts a microwave carrier frequency.

12 Claims, 4 Drawing Sheets

(56) References Cited

U.S. PATENT DOCUMENTS

| | | |
|---|---|---|
| 7,146,136 B2 | 12/2006 | Consolazio |
| 7,206,520 B2 * | 4/2007 | Way et al. .................... 398/186 |
| 7,269,354 B1 * | 9/2007 | Silverman et al. ............ 398/115 |
| 7,593,646 B2 * | 9/2009 | Vassilieva et al. ............ 398/182 |
| 7,751,722 B2 * | 7/2010 | Sasai ............................ 398/163 |
| 7,761,012 B2 * | 7/2010 | Yu et al. ....................... 398/188 |
| 7,773,883 B1 * | 8/2010 | Weng et al. ..................... 398/83 |
| 7,835,650 B2 * | 11/2010 | Li et al. ........................ 398/212 |
| 7,884,996 B2 * | 2/2011 | Hasegawa et al. ............ 359/325 |
| 8,026,837 B1 * | 9/2011 | Valley et al. ................. 341/137 |
| 8,620,158 B2 * | 12/2013 | Peach et al. .................... 398/66 |
| 8,824,901 B2 * | 9/2014 | Devgan et al. ................ 398/198 |
| 2001/0030796 A1 * | 10/2001 | Yao ............................... 359/334 |
| 2003/0198477 A1 * | 10/2003 | Kuri et al. .................... 398/183 |
| 2004/0081470 A1 * | 4/2004 | Griffin .......................... 398/188 |
| 2004/0190911 A1 * | 9/2004 | Franco et al. ................. 398/189 |
| 2005/0286908 A1 * | 12/2005 | Way ............................. 398/186 |
| 2006/0056845 A1 * | 3/2006 | Parsons et al. .................. 398/41 |
| 2006/0140643 A1 * | 6/2006 | Way et al. .................... 398/183 |
| 2007/0025421 A1 * | 2/2007 | Shattil ........................... 375/136 |
| 2007/0280704 A1 | 12/2007 | Fitzgerald et al. |
| 2008/0212974 A1 | 9/2008 | Davies et al. |
| 2009/0092395 A1 * | 4/2009 | Vassilieva et al. .............. 398/79 |
| 2009/0263144 A1 * | 10/2009 | McKinney .................... 398/214 |
| 2009/0297140 A1 * | 12/2009 | Heismann et al. .............. 398/16 |
| 2009/0304395 A1 * | 12/2009 | Hong et al. .................... 398/189 |
| 2010/0014874 A1 * | 1/2010 | Kawanishi et al. ........... 398/187 |
| 2010/0061738 A1 * | 3/2010 | Giorgi et al. .................. 398/149 |
| 2010/0254718 A1 | 10/2010 | Oda et al. |
| 2010/0266289 A1 * | 10/2010 | Devgan et al. ................ 398/147 |
| 2011/0076027 A1 * | 3/2011 | Kiuchi .......................... 398/141 |
| 2013/0051723 A1 * | 2/2013 | Sudo et al. ........................ 385/3 |
| 2013/0183041 A1 * | 7/2013 | Wan et al. ....................... 398/81 |
| 2013/0235443 A1 * | 9/2013 | Chou et al. .................... 359/238 |

OTHER PUBLICATIONS

International Search Report issued in corresponding PCT Patent Application No. PCT/CN2011/073071, mailed Feb. 9, 2012.

* cited by examiner

SIGNAL RECEIVING METHOD BASED ON MICROWAVE PHOTONICS TECHNOLOGIES

CROSS-REFERENCE TO RELATED APPLICATIONS

This application is a continuation of International Application No. PCT/CN2011/073071, filed on Apr. 20, 2011, which is hereby incorporated by reference in their entireties.

FIELD OF THE APPLICATION

The present application relates to the field of communications, and in particular, to a signal receiving device and a signal receiving method based on microwave photonics technologies.

BACKGROUND OF THE APPLICATION

With the arising and application of 3G and 4G technologies, wireless communications impose an increasingly high requirement on the transmission rate, and microwave photonics technologies have gradually become an important technology in wireless communications due to the advantage of high speed.

A wireless communication system generally includes a signal transmitter and a signal receiving device. In the prior art, a signal receiving device based on microwave photonics technologies is provided. As shown in FIG. 1, the signal receiving device is disposed with a local oscillator, and the local oscillator is formed by an optical frequency comb generator (Optical Frequency Comb Generator, abbreviated as OFCG) and two optical phase locked loops (Optical Phase Locked Loops, abbreviated as OPLLs). The OFCG is configured to generate two optical signals which have their respective frequencies are V3 and V4 and have different frequencies, in which frequencies of the two optical signals are locked by the OPLLs, then enter a traveling wave uni-traveling-carrier photodiode (Traveling Wave Uni-Traveling-Carrier Photodiode, abbreviated as TW-UTC PD), and are mixed with a signal which has its frequency is V1-V2 and is received from an antenna after being outputted from the TW-UTC PD. A mixed signal enters a band-pass filter and is filtered, and then amplified, to obtain a medium frequency signal. The medium frequency signal can be directly input into a high-speed analog-to-digital converter (Analog-to-Digital Converter, abbreviated as ADC) or a down converter for baseband signal demodulation.

After the optical signals generated by the local oscillator pass through the TW-UTC PD, a noise is introduced, so an error is inevitably caused after the optical signals generated by the local oscillator are mixed with the signal received from the antenna, which in turn influences the accuracy of the whole system. When a microwave carrier frequency needs to be adjusted, the OFCG needs to be adjusted, and the process is troublesome, inflexible, and less accurate. The OPLL, the OFCG and the TW-UTC PD have a high market price, and a high cost.

SUMMARY OF THE APPLICATION

In order to solve the technical problems, embodiments are disclosed that provide a signal receiving device and a signal receiving method based on microwave photonics technologies. By adopting quadrature demodulation, a structure of the signal receiving device is simplified, the demodulation of a high-order modulation signal can be implemented, and a microwave carrier frequency can be flexibly adjusted, thereby widening an application range.

The embodiments adopt the following technical solutions.

A signal receiving device based on microwave photonics technologies includes a signal generation module, a first Mach-Zehnder modulator, a dispersion module, a second Mach-Zehnder modulator, and a signal conversion module.

The signal generation module is connected to the first Mach-Zehnder modulator. The signal generation module generates a beam of signals including two optical signals with different wavelengths. The first Mach-Zehnder modulator modulates the signal that is input by the signal generation module and includes the two optical signals with different wavelengths into a first signal, in which the first signal includes two signals each carrying a receiving microwave carrier frequency.

The dispersion module is connected to the first Mach-Zehnder modulator and the second Mach-Zehnder modulator. The dispersion module adjusts the dispersion of one of the two signals each carrying the receiving microwave carrier frequency, in which after the dispersion adjustment, a relative phase difference between the two signals each carrying the receiving microwave carrier frequency is 90 degrees.

The second Mach-Zehnder modulator mixes a received microwave signal carrying a baseband signal with the two signals each carrying the receiving microwave carrier frequency after the dispersion adjustment, to obtain a second signal, in which the second signal includes two signals carrying baseband signal spectrum components.

The second Mach-Zehnder modulator is connected to the signal conversion module, and the signal conversion module converts the second signal into a digital signal.

A signal receiving method based on microwave photonics technologies includes:
  generating a beam of signals including two optical signals with different wavelengths;
  modulating the signals including the two optical signals with different wavelengths into a first signal, in which the first signal includes two signals each carrying a receiving microwave carrier frequency;
  adjusting the dispersion of one of the two signals each carrying the receiving microwave carrier frequency, in which after the dispersion adjustment, a relative phase difference between the two signals each carrying the receiving microwave carrier frequency is 90 degrees;
  mixing a received microwave signal carrying a baseband signal with the signals each carrying the receiving microwave carrier frequency after the dispersion adjustment, to obtain a second signal, in which the second signal includes two signals carrying baseband signal spectrum components; and
  converting the second signal into a digital signal.

A microwave signal transceiver system includes a microwave signal transmitter, and also a signal generation module, a third Mach-Zehnder modulator, an optical coupler, a first Mach-Zehnder modulator, a dispersion module, a second Mach-Zehnder modulator, and a signal conversion module connected in sequence, in which the microwave signal transmitter is connected to the optical coupler.

The signal generation module generates a beam of signals including two optical signals with different wavelengths, and the third Mach-Zehnder modulator modulates the signal that is input by the signal generation module and includes the two optical signals with different wavelengths into a third signal, in which the third signal includes two optical carrier signals each carrying a transmitting microwave carrier frequency.

The first Mach-Zehnder modulator modulates the third signal into a fourth signal, in which the fourth signal includes two signals each carrying a receiving microwave carrier frequency.

The dispersion module adjusts the dispersion of one of the two signals each carrying the receiving microwave carrier frequency, in which after the dispersion adjustment, a relative phase difference between the two signals each carrying the receiving microwave carrier frequency is 90 degrees.

The second Mach-Zehnder modulator mixes a received microwave signal carrying a baseband signal with the two signals each carrying the receiving microwave carrier frequency after the dispersion adjustment, to obtain a fifth signal, in which the fifth signal includes two signals carrying baseband signal spectrum components.

The signal conversion module converts the fifth signal into a digital signal.

In the signal receiving device and the signal receiving method based on microwave photonics technologies according to the embodiments, with the use of the Mach-Zehnder modulators, not only a structure of the signal receiving device is simplified, but also the use of the OPLL, the OFCG and the TW-UTC PD in the prior art is avoided, thereby reducing the cost and improving the accuracy of the signal receiving device. In the embodiments, by adopting quadrature demodulation, the demodulation of a high-order modulation signal can be implemented, and a microwave carrier frequency can be flexibly adjusted through the Mach-Zehnder modulator, thereby greatly widening an application range.

BRIEF DESCRIPTION OF THE DRAWINGS

The embodiments are described below with references to the accompanying drawings. The embodiments are merely exemplary. Other embodiments may exist that fall within the scope of the claims.

DESCRIPTION OF NUMERALS IN THE DRAWINGS

1: signal generation module; 11: first laser; 12: second laser; 13: first wavelength division multiplexer; 2: first Mach-Zehnder modulator; 3: dispersion module; 4: second Mach-Zehnder modulator; 5: signal conversion module; 51: second wavelength division multiplexer; 52: electrical-to-optical converter; 53: analog-to-digital converter; 6: third Mach-Zehnder modulator; 7: optical coupler; 8: band-pass filter; 9: third wavelength division multiplexer; and 10: fourth wavelength division multiplexer

DETAILED DESCRIPTION OF THE EMBODIMENTS

The embodiments described below provide a signal receiving device and a signal receiving method based on microwave photonics technologies. By adopting mixing manners of a Mach-Zehnder modulator and quadrature demodulation, a structure of the signal receiving device is simplified, the demodulation of a high-order modulation signal can be implemented, and a microwave carrier frequency can be flexibly adjusted, thereby widening an application range.

Embodiment 1

Figure 1:
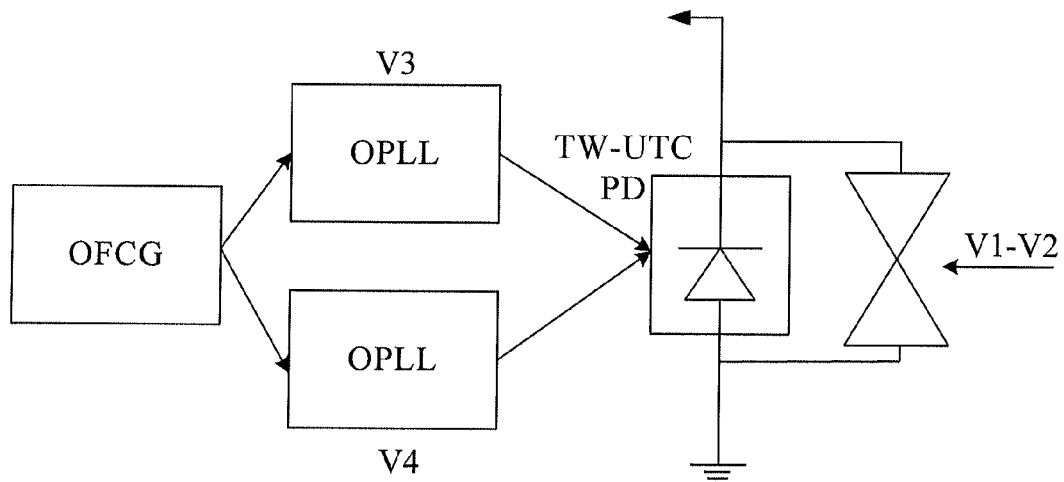
FIG. 1 is a schematic structural diagram of a signal receiving device in the prior art.
Figure 2:
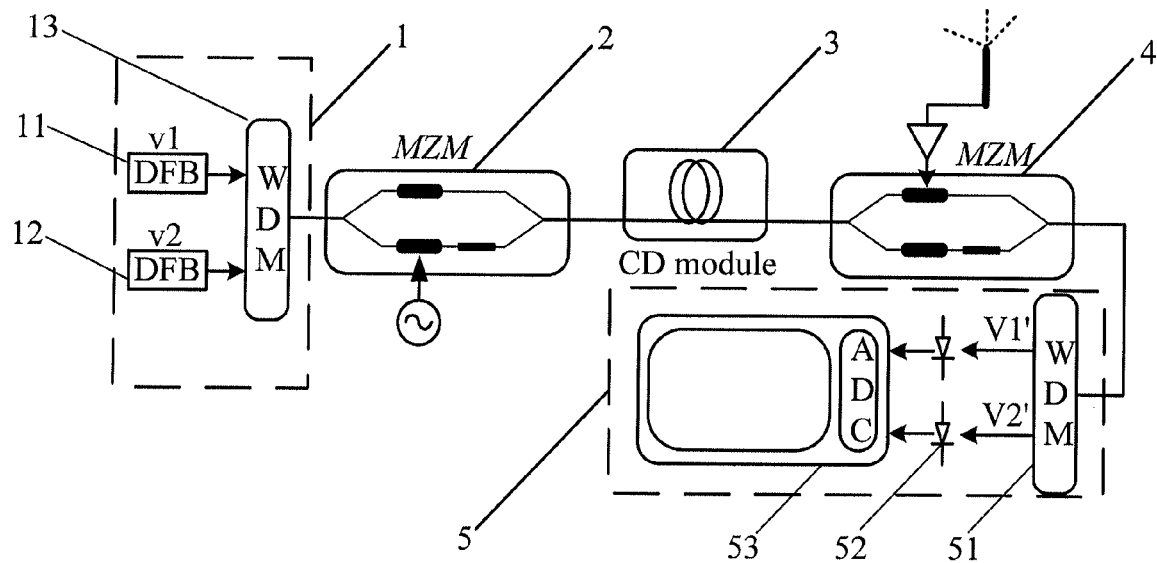
FIG. 2 is a schematic structural diagram of a signal receiving device based on microwave photonics technologies in an embodiment.

This embodiment provides a signal receiving device based on microwave photonics technologies. As shown in FIG. 2, the device includes:

a signal generation module 1, a first Mach-Zehnder modulator 2, a dispersion module 3, a second Mach-Zehnder modulator 4, and a signal conversion module 5.

The working principle of the Mach-Zehnder modulator (Mach-Zehnder Modulator, abbreviated as MZM) is to split input light into two equivalent signals, which respectively enter two optical branches of the modulator. The two optical branches are made from an electrical-to-optical material whose refractive index varies with the level of an external electrical signal applied. As the variation of the refractive index of the optical branches can cause the change of the phase of a signal, when the signals in the two branches are combined again at an output end of the modulator, the combined optical signal is an interference signal with changed intensity, thereby achieving the modulation of light intensity.

In this embodiment, the signal generation module 1 is connected to the first Mach-Zehnder modulator 2. The signal generation module 1 generates a beam of signals including two optical signals with different wavelengths. The first Mach-Zehnder modulator 2 modulates the signal that is input by the signal generation module 1 and includes the two optical signals with different wavelengths into a first signal, in which the first signal includes two signals each carrying a receiving microwave carrier frequency. The receiving microwave carrier frequency refers to a carrier frequency used in receiving a signal. Herein, the function of the first Mach-Zehnder modulator 2 is to convert the two optical signals with different wavelengths into the two signals each carrying the receiving microwave carrier frequency. Therefore, the microwave carrier frequency can be flexibly adjusted by the Mach-Zehnder modulator 2 according to requirements.

The dispersion module 3 is connected to the first Mach-Zehnder modulator 2 and the second Mach-Zehnder modulator 4. After two converted signals each carrying the receiving microwave carrier frequency enters the dispersion module, the dispersion module 3 adjusts the dispersion of one of the two signals each carrying the receiving microwave carrier frequency, in which after the dispersion adjustment, a relative phase difference between the two signals each carrying the receiving microwave carrier frequency is 90 degrees, that is, orthogonal. As the working principle of the dispersion module 3 is to adjust a light wave with a certain specific wavelength, the dispersion module 3 can accurately adjust the dispersion of one of the two signals each carrying the receiving microwave carrier frequency.

The second Mach-Zehnder modulator 4 mixes a received microwave signal carrying a baseband signal with the two signals each carrying the receiving microwave carrier frequency after the dispersion adjustment, to obtain a second signal, in which the second signal includes two signals carrying baseband signal spectrum components. A carrier frequency of the microwave signal carrying the baseband signal is consistent with the receiving microwave carrier frequency.

The second Mach-Zehnder modulator 4 is connected to the signal conversion module 5. The signal conversion module 5 further processes the second signal input by the second Mach-Zehnder modulator 4. The signal conversion module 5 converts the second signal into a digital signal.

In the signal receiving device based on microwave photonics technologies according to this embodiment, with the use of the Mach-Zehnder modulators, not only a structure of the signal receiving device is simplified, but also the use of the OPLL, the OFCG and the TW-UTC PD is avoided, thereby reducing the cost and improving the accuracy of the signal receiving device. Moreover, in the embodiment, by adopting quadrature demodulation, the demodulation of a high-order modulation signal can be implemented, and the microwave carrier frequency can be flexibly adjusted by the Mach-Zehnder modulator, thereby greatly widening an application range.

Embodiment 2

Figure 8:
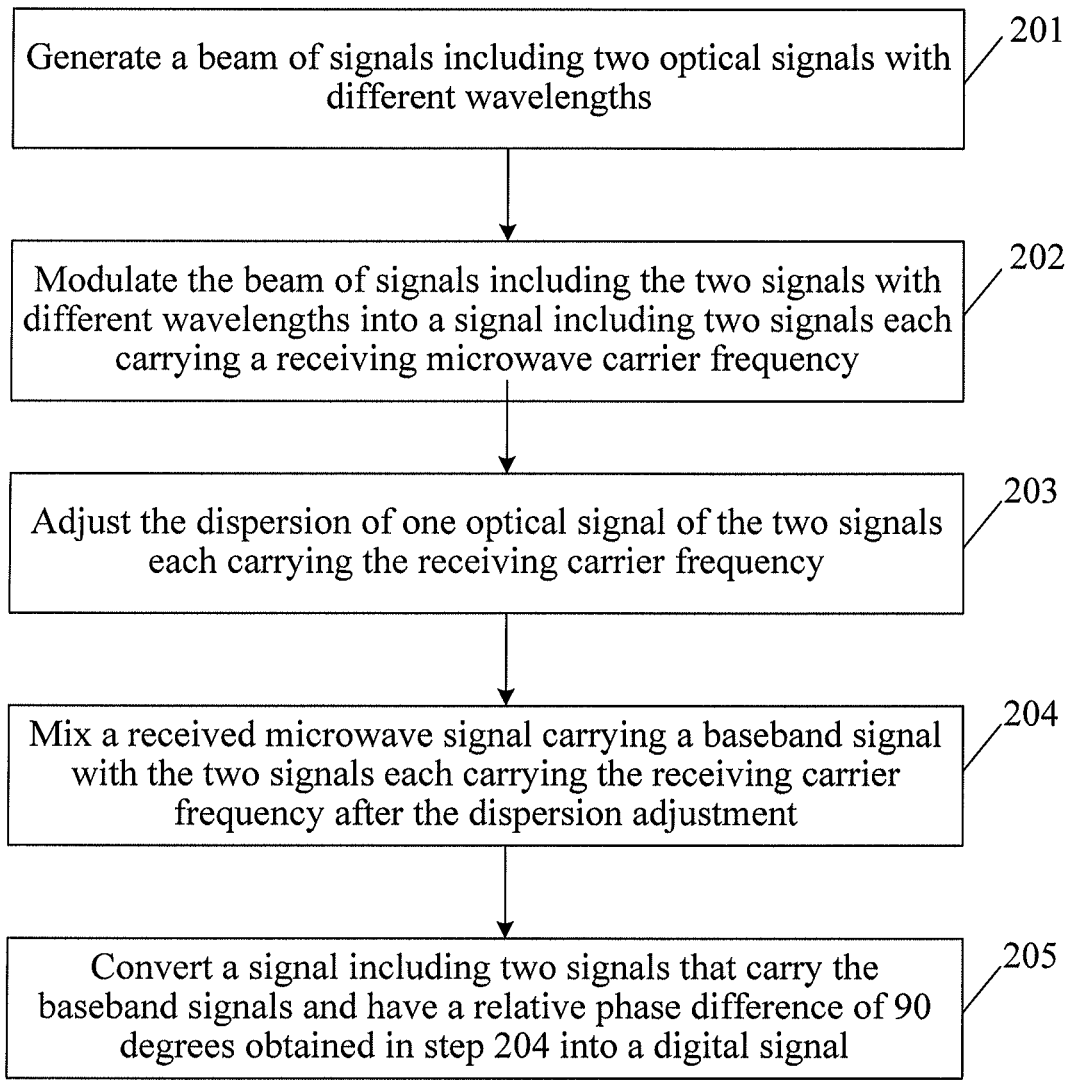
FIG. 8 is a flow chart of a signal receiving method based on microwave photonics technologies in an embodiment.

This embodiment provides a signal receiving method based on microwave photonics technologies. As shown in FIG. 8, the method includes:

Step 201: Generate a beam of signals including two optical signals with different wavelengths.

For example, the beam of signals including the two optical signals with different wavelengths may be generated by a signal generation module. Furthermore, the signal generation module includes two lasers and one wavelength division multiplexer, the two lasers are configured to obtain the two optical signals with different wavelengths, and the wavelength division multiplexer is configured to combine the two optical signals with different wavelengths into the beam of optical signals.

Step 202: Modulate the signals including the two optical signals with different wavelengths into a first signal, in which the first signal includes two signals each carrying a receiving microwave carrier frequency.

For examples, in this embodiment, a first Mach-Zehnder modulator may be used to modulate the input signals including the two optical signals with different wavelengths into the first signal, in which the first signal includes the two signals each carrying the receiving microwave carrier frequency. Herein, the function of the first Mach-Zehnder modulator is to convert the two optical signals with different wavelengths into the two signals each carrying the receiving microwave carrier frequency. The microwave carrier frequency can be flexibly adjusted by the Mach-Zehnder modulator.

Step 203: Adjust the dispersion of one of the two signals each carrying the receiving microwave carrier frequency, in which after the dispersion adjustment, a relative phase difference between the two signals each carrying the receiving microwave carrier frequency is 90 degrees.

This step can be implemented by a dispersion module. After the two signals each carrying the receiving microwave carrier frequency converted in step 202 enter the dispersion module, the dispersion module adjusts the dispersion of one of the two signals each carrying the receiving microwave carrier frequency, in which after the dispersion adjustment, the relative phase difference between the two signals each carrying the receiving microwave carrier frequency is 90 degrees. As the working principle of the dispersion module is to adjust a light wave with a certain specific wavelength, the dispersion module can accurately adjust the dispersion of one of the two signals each carrying the receiving microwave carrier frequency.

Step 204: Mix a received microwave signal carrying a baseband signal with the two signals each carrying the receiving microwave carrier frequency after the dispersion adjustment, to obtain a second signal, in which the second signal includes two signals carrying baseband signal spectrum components.

For example, in this embodiment, a second Mach-Zehnder modulator may be used to mix the received microwave signal carrying the baseband signal with the two signals each carrying the receiving microwave carrier frequency after the dispersion adjustment, to obtain the second signal, in which the second signal includes the two signals carrying the baseband signal spectrum components. A carrier frequency of the microwave signal carrying the baseband signal received by the signal receiving device is consistent with the receiving microwave carrier frequency.

Step 205: Convert the second signal obtained in step 204 into a digital signal.

For example, in this embodiment, a signal conversion module may be used to further process the second signal input in step 204, to convert the second signal into a digital signal, for being further demodulated by a subsequent device.

In this embodiment, the converting the second signal into the digital signal includes:
  splitting the second signal into two beams of signals that have different wavelengths and carry baseband signal spectrum components;
  converting the two beams of signals that have different wavelengths and carry the baseband signal spectrum components into two beams of electrical signals carrying baseband signals; and
  converting the two beams of electrical signals carrying the baseband signals into the digital signal.

In the signal receiving method based on microwave photonics technologies according to this embodiment, the input signal including the two optical signals with different wavelengths is modulated into the first signal firstly, in which the first signal includes the two signals each carrying the receiving microwave carrier frequency. Then the dispersion of one optical signal of the two optical carrier signals each carrying the receiving microwave carrier frequency is adjusted, in which after the dispersion adjustment, the two signals each carrying the receiving microwave carrier frequency are orthogonal, that is, the relative phase difference is 90 degrees. Subsequently, the received microwave signal carrying the baseband signal and the two optical carrier signals each carrying the receiving microwave carrier frequency after the dispersion adjustment are mixed. That is, by adopting the quadrature demodulation, the demodulation of a high-order modulation signal can be implemented, and the microwave carrier frequency can be flexibly adjusted, thereby widening an application range.

Embodiment 3

This embodiment provides a signal receiving device based on microwave photonics technologies. As shown in FIG. 2, the device includes:
  a signal generation module 1, a first Mach-Zehnder modulator 2, a dispersion module 3, a second Mach-Zehnder modulator 4, and a signal conversion module 5.

Figure 3:
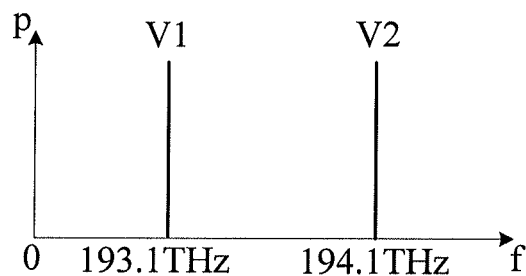
FIG. 3 shows a first signal spectrum in an embodiment.

In this embodiment, the signal generation module 1 includes a first laser 11, a second laser 12, and a first wavelength division multiplexer 13. As shown in FIG. 3, the first laser 11 and the second laser 12 are configured to obtain two optical signals with different wavelengths, in which frequencies of the two optical signals are V1 and V2 respectively, and the frequency V1 is 193.1 THz and the frequency V2 is 194.1 THz. The first wavelength division multiplexer 13 is configured to combine the two optical signals with different wavelengths into a beam of optical signal, where the frequencies of the two optical signals are V1 and V2, respectively. The signal generation module 1 is connected to the first Mach-Zehnder modulator 2. In addition, it is specified in this embodiment that a signal receiving microwave carrier frequency is 83.5 GHz.

Figure 4:
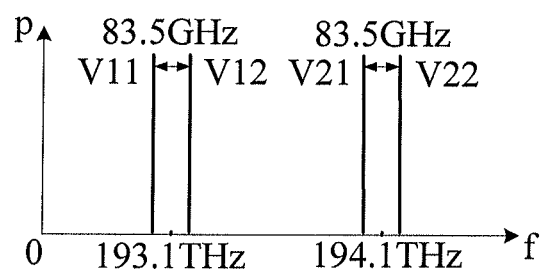
FIG. 4 shows a second signal spectrum in an embodiment.

As shown in FIG. 4, the first Mach-Zehnder modulator 2 modulates a signal that is input by the signal generation module 1 and includes two optical signals which have their respective frequencies V1 and V2 and have different wavelengths into a signal that includes two optical signals which have their respective frequencies (V11-V12) and (V21-V22), and the signal is defined as a first signal. The first signal includes two signals each carrying a receiving microwave carrier frequency of 83.5 GHz. Herein, the function of the first Mach-Zehnder modulator 2 is to convert two optical signals which have their respective frequencies V1 and V2 and have different wavelengths into two signals that carry their respective receiving microwave carrier frequencies (V11-V12) and (V21-V22). By the Mach-Zehnder modulator 2, the microwave carrier frequency can be flexibly adjusted.

Figure 5:
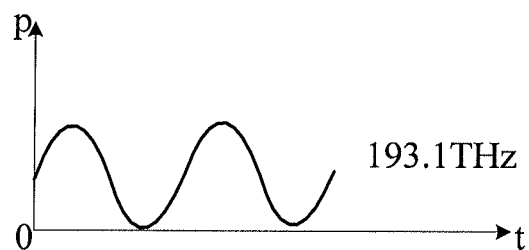
FIG. 5 shows a third signal spectrum in an embodiment.
Figure 6:
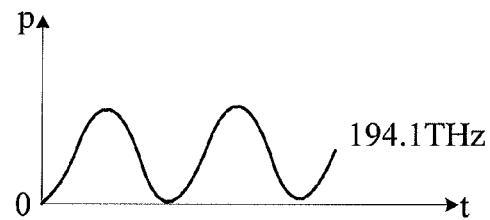
FIG. 6 shows a fourth signal spectrum in an embodiment.

The dispersion module 3 is connected to the first Mach-Zehnder modulator 2 and the second Mach-Zehnder modulator 4. As shown in FIG. 5 and FIG. 6, a light wave with a frequency of V11-V12 exists in an optical carrier with the frequency of 193.1 THz, and a light wave with a frequency of V21-V22 exists in an optical carrier with the frequency of 194.1 THz. After the two converted signals that carry their receiving microwave carrier frequencies (V11-V12) and (V21-V22) enter the dispersion module 3, the dispersion module 3 adjusts the dispersion of one of the two signals carrying the receiving microwave carrier frequencies, and after the dispersion adjustment, a relative phase difference between the two signals that carry their receiving microwave carrier frequencies (V11-V12) and (V21-V22) is 90 degrees, that is, orthogonal. As the working principle of the dispersion module 3 is to adjust a light wave with a certain specific wavelength, the dispersion module 3 can accurately adjust the dispersion of one of the two signals carrying the receiving microwave carrier frequencies. The dispersion module 3 may be a dispersion fiber.

The second Mach-Zehnder modulator 4 mixes a received microwave signal carrying a baseband signal with the two signals carrying the receiving microwave carrier frequencies after the dispersion adjustment, to obtain a second signal, in which the second signal includes two signals carrying baseband signal spectrum components. A carrier frequency of the microwave signal that carries the baseband signal and is received by the signal receiving device is consistent with the receiving microwave carrier frequencies, and is 83.5 GHz. After two beams of signals are mixed by the second Mach-Zehnder modulator 4, obtained signals are two signals carrying baseband signal spectrum components.

The second Mach-Zehnder modulator 4 is connected to the signal conversion module 5, and the signal conversion module 5 further processes the second signal input by the second Mach-Zehnder modulator 4.

In this embodiment, the signal conversion module 5 includes a second wavelength division multiplexer 51, an electrical-to-optical converter 52, and an analog-to-digital converter 53. The second wavelength division multiplexer 51 is connected to the second Mach-Zehnder modulator 4, and the electrical-to-optical converter 52 is connected to the second wavelength division multiplexer 51 and the analog-to-digital converter 53. The second wavelength division multiplexer 51 splits the second signal into two beams of signals that have their respective frequencies V1' and V2' and have different wavelengths and carry baseband signal spectrum components, the electrical-to-optical converter 52 converts the two beams of signals that have their respective frequencies V1' and V2' and have different wavelengths and carry the baseband signal spectrum components into two beams of electrical signals carrying baseband signals, and the analog-to-digital converter 53 converts the two beams of electrical signals carrying the baseband signals into a digital signal, for being further demodulated by a system.

In the technical solutions according to the embodiment, the optical carrier signal carrying the receiving microwave carrier frequency is modulated by using the Mach-Zehnder modulator, so that not only a structure of the signal receiving device is simplified, but also problems of high cost and noise introduction caused by the use of the OPLL, the OFCG and the TW-UTC PD in the prior art are avoided, thereby reducing the cost and improving the accuracy of the signal receiving device. In the embodiments, by adopting quadrature demodulation, the Mach-Zehnder modulator is used to mix the received microwave signal that carries the baseband signal and the optical carrier signals that carry the receiving microwave carrier frequencies and have the relative phase difference of 90 degrees after the dispersion adjustment. In this way, the demodulation of a high-order modulation signal can be implemented, and the microwave carrier frequency can be flexibly adjusted by the Mach-Zehnder modulator, thereby greatly widening an application range.

Embodiment 4

Figure 7:
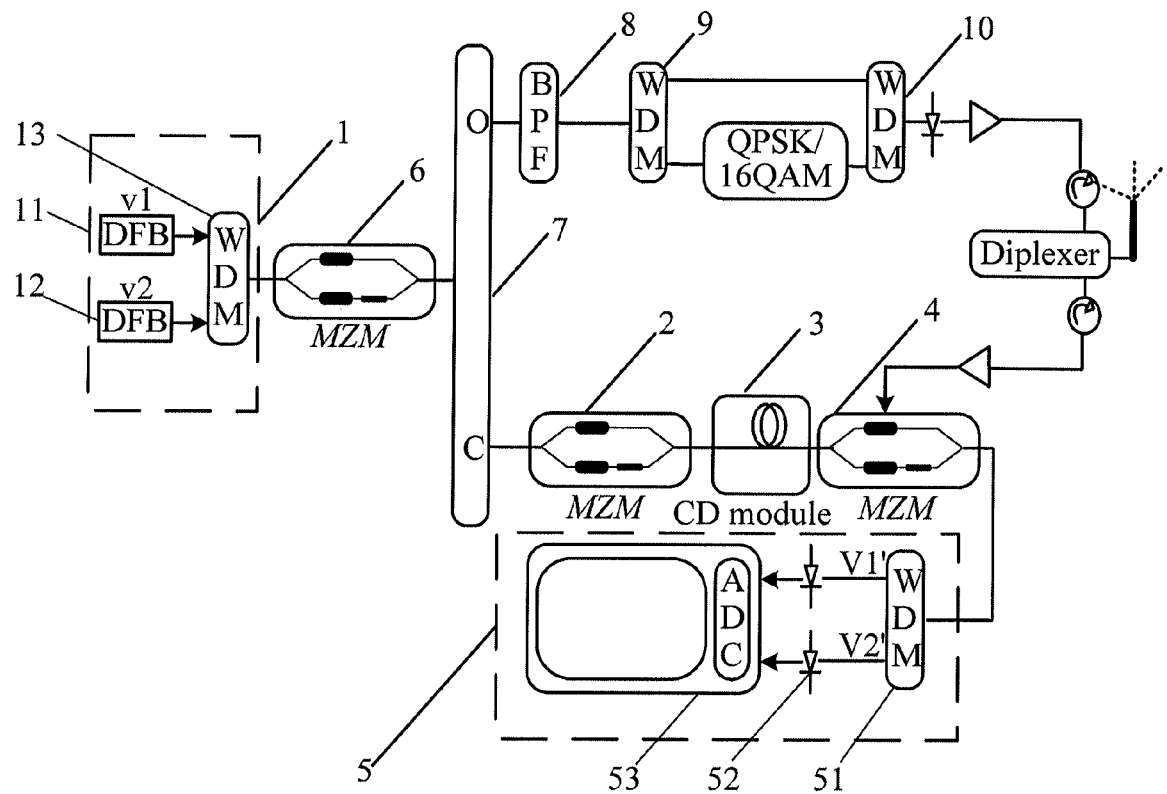
FIG. 7 is a schematic diagram of a microwave signal transceiver system in an embodiment.

This embodiment provides a microwave signal transceiver system, as shown in FIG. 7.

The signal receiving device based on microwave photonics technologies according to Embodiment 3 may be integrated into a microwave signal transceiver system, and serve as a microwave signal receiving device.

In this embodiment, it is specified that a signal transmitting carrier frequency is 73.5 GHz, and a signal receiving carrier frequency is 83.5 GHz.

In this embodiment, the microwave signal transceiver system includes a microwave signal transmitter, and also a signal generation module 1, a third Mach-Zehnder modulator 6, an optical coupler 7, a first Mach-Zehnder modulator 2, a dispersion module 3, a second Mach-Zehnder modulator 4, and a signal conversion module 5 connected in sequence, in which the microwave signal transmitter is connected to the optical coupler 7.

The signal generation module generates a beam of signals including two optical signals with different wavelengths, the third Mach-Zehnder modulator modulates the signal that is input by the signal generation module and includes the two optical signals with different wavelengths into a third signal, in which the third signal includes two optical carrier signals each carrying a transmitting microwave carrier frequency of 73.5 GHz.

The first Mach-Zehnder modulator modulates the third signal into a fourth signal, in which the fourth signal includes two signals each carrying a receiving microwave carrier frequency of 83.5 GHz.

The dispersion module adjusts the dispersion of one of the two signals each carrying the receiving microwave carrier frequency of 83.5 GHz, in which after the dispersion adjustment, a relative phase difference between the two signals each carrying the receiving microwave carrier frequency of 83.5 GHz is 90 degrees.

The second Mach-Zehnder modulator mixes a received microwave signal carrying a baseband signal with the two signals each carrying the receiving microwave carrier frequency of 83.5 GHz after the dispersion adjustment, to obtain a fifth signal, in which the fifth signal includes two signals carrying baseband signal spectrum components.

The signal conversion module converts the fifth signal into a digital signal.

As shown in FIG. 7, to obtain optical carrier signals each carrying a transmitting carrier frequency of 73.5 GHz, in this embodiment, the third Mach-Zehnder modulator 6 and the optical coupler 7 can be sequentially connected between the signal generation module 1 and the first Mach-Zehnder modulator 2 in the microwave signal receiving device according to Embodiment 3. The third Mach-Zehnder modulator 6 is configured to convert the beam of signal including the two optical signals with different wavelengths into the third signal, in which the third signal includes the two signals each carrying the transmitting carrier frequency of 73.5 GHz. The optical coupler 7 equally splits a third signal including the two optical carrier signals each carrying the transmitting carrier frequency of 73.5 GHz into two beams, and inputs the two beams respectively into the first Mach-Zehnder modulator of the signal receiving device according to the embodiment and the microwave signal transmitter. The first Mach-Zehnder modulator modulates the signal including the two optical carrier signals each carrying the transmitting carrier frequency of 73.5 GHz into the fourth signal, in which the fourth signal includes two signals each carrying a receiving microwave carrier frequency of 83.5 GHz. The further processing performed by the microwave signal receiving device on the beam of fourth signal including the two signals each carrying the receiving microwave carrier frequency of 83.5 GHz is the same as the processing performed by the microwave signal receiving device according to Embodiment 3, and is not further repeated herein again.

The microwave signal transmitter according to this embodiment includes a band-pass filter 8, a third wavelength division multiplexer 9, and a fourth wavelength division multiplexer 10. The band-pass filter 8 filters off one of the two optical carrier signals that each carry the transmitting carrier frequency of 73.5 GHz and are included in the beam input by the optical coupler 7, and has only one wave left for modulation and transmission. The third wavelength division multiplexer 9 splits the left one wave into two beams, and performs quadrature modulation on one of the two beams. If quadrate phase shift keying (Quadrate Phase Shift Keying, abbreviated as QPSK) modulation is used, waves are combined after modulation, for being used in subsequent processing.

In the microwave signal transceiver system according to this embodiment, the third Mach-Zehnder modulator modulates the signal that is generated by the signal generation module and includes the two optical signals with different wavelengths into the third signal including the two signals each carrying the transmitting microwave carrier frequency, and the optical coupler 7 equally splits the third signal into two beams and respectively inputs the two beams into the first Mach-Zehnder modulator and the microwave signal transmitter. The beam input into the first Mach-Zehnder modulator is adjusted by the first Mach-Zehnder modulator to the fourth signal including the two signals each carrying the receiving microwave carrier frequency, and the dispersion module adjusts the dispersion of one optical signal of the fourth signal, in which after the dispersion adjustment, the two signals each carrying the receiving microwave carrier frequency are orthogonal, that is, the relative phase difference is 90 degrees. The second Mach-Zehnder modulator mixes the received microwave signal carrying the baseband signal with the two signals each carrying the receiving microwave carrier frequency after the dispersion adjustment. That is, by adopting quadrature demodulation, the demodulation of a high-order modulation signal can be implemented, and the microwave carrier frequency can be flexibly adjusted, thereby widening an application range.

Through the foregoing description of the embodiments, it is apparent to persons skilled in the art that the claims may be implemented by software plus necessary universal hardware, and may also be implemented by hardware. Based on such understanding, the technical solutions of the claims or the part that makes contributions to the prior art can be substantially embodied in the form of a software product. The computer software product is stored in a computer readable storage medium, for example, a floppy disk, hard disk, or optical disk of the computer, and contains several instructions used to instruct a computer device (for example, a personal computer, a server, or a network device) to perform the methods according to the embodiments.

The embodiments described above are merely exemplary and are not intended to limit the scope of the claims. It is understood that the embodiments may be modified in many ways. Such modified embodiments are understood to still fall within the scope of the claims.

The invention claimed is:

1. A microwave photonics based signal receiving device, comprising:
    a signal generation module;
    a first Mach-Zehnder modulator;
    a dispersion module;
    a second Mach-Zehnder modulator; and
    a signal conversion module,
    wherein:
        the signal generation module is connected to the first Mach-Zehnder modulator, the signal generation module generates a beam of signals comprising two optical signals with different wavelengths, and the first Mach-Zehnder modulator modulates the beam of signals into a first signal, wherein the first signal comprises two signals each carrying a receiving microwave carrier frequency;
        the dispersion module is connected to the first Mach-Zehnder modulator and the second Mach-Zehnder modulator, and the dispersion module adjusts dispersion of one of the two signals each carrying the receiving microwave carrier frequency, wherein after the dispersion adjustment, a relative phase difference between the two signals each carrying the receiving microwave carrier frequency is 90 degrees;
        the second Mach-Zehnder modulator mixes a received microwave signal carrying a baseband signal with the two signals each carrying the receiving microwave carrier frequency after the dispersion adjustment to obtain a second signal, wherein the second signal comprises two signals carrying baseband signal spectrum components; and
        the second Mach-Zehnder modulator is connected to the signal conversion module, and the signal conversion module converts the second signal into a digital signal.

2. The microwave photonics based signal receiving device according to claim 1, wherein a carrier frequency of the received microwave signal carrying the baseband signal is the receiving microwave carrier frequency.

3. The microwave photonics based signal receiving device according to claim 1, wherein the signal generation module comprises two lasers and one wavelength division multiplexer, the two lasers are configured to obtain the two optical signals with different wavelengths, and the wavelength division multiplexer is configured to combine the two optical signals with different wavelengths into the beam of signals.

4. The microwave photonics based signal receiving device based according to claim 1, wherein the signal conversion module comprises a wavelength division multiplexer, an electrical-to-optical converter, and an analog-to-digital converter, wherein the wavelength division multiplexer is connected to the second Mach-Zehnder modulator, and the electrical-to-optical converter is connected to the wavelength division multiplexer and the analog-to-digital converter.

5. The microwave photonics based signal receiving device according to claim 4, wherein the wavelength division multiplexer splits the second signal into two beams of signals that have different wavelengths and carry the baseband signal spectrum components, the electrical-to-optical converter converts the two beams of signals that have different wavelengths and carry the baseband signal spectrum components into two beams of electrical signals carrying baseband signals, and the analog-to-digital converter converts the two beams of electrical signals carrying the baseband signals into the digital signal.

6. The microwave photonics based signal receiving device according to claim 1, wherein the signal generation module further comprises a third Mach-Zehnder modulator, and the third Mach-Zehnder modulator is connected to the wavelength division multiplexer, and is configured to modulate the two optical signals with different wavelengths into two optical carrier signals each carrying a transmitting carrier frequency.

7. The microwave photonics based signal receiving device according to claim 1, wherein the dispersion module is a dispersion fiber.

8. A microwave photonics based signal receiving method, comprising:
generating a beam of signals comprising two optical signals with different wavelengths;
modulating the beam of signals comprising the two optical signals with different wavelengths into a first signal, wherein the first signal comprises two signals each carrying a receiving microwave carrier frequency;
adjusting dispersion of one of the two signals that carry the receiving microwave carrier frequency, wherein after the dispersion adjustment, a relative phase difference between the two signals that carry the receiving microwave carrier frequency is 90 degrees;
mixing a received microwave signal carrying a baseband signal with the signals that carry the receiving microwave carrier frequency after the dispersion adjustment to obtain a second signal, wherein the second signal comprises two signals carrying baseband signal spectrum components; and
converting the second signal into a digital signal.

9. The microwave photonics based signal receiving method according to claim 8, wherein a carrier frequency of the received microwave signal carrying the baseband signal is the receiving microwave carrier frequency.

10. The microwave photonics based signal receiving method according to claim 8, wherein generation of the beam of signals comprising the two optical signals with different wavelengths comprises:
acquiring the two optical signals with different wavelengths, and combining the two optical signals with different wavelengths into the beam of signals.

11. The microwave photonics based signal receiving method according to claim 8, wherein conversion of the second signal into the digital signal comprises:
splitting the second signal into two beams of signals that have different wavelengths and carry the baseband signal spectrum components;
converting the two beams of signals that have different wavelengths and carry the baseband signal spectrum components into two beams of electrical signals carrying baseband signals; and
converting the two beams of electrical signals carrying the baseband signals into the digital signal.

12. A microwave signal transceiver system, comprising:
a microwave signal transmitter, and further comprising a signal generation module, a first Mach-Zehnder modulator, an optical coupler, a second Mach-Zehnder modulator, a dispersion module, a third Mach-Zehnder modulator, and a signal conversion module connected in sequence, wherein the microwave signal transmitter is connected to the optical coupler;
wherein the signal generation module generates a beam of signals comprising two optical signals with different wavelengths, and the first Mach-Zehnder modulator modulates the beam of signals that are input by the signal generation module that comprise the two optical signals with different wavelengths into a first signal, wherein the first signal comprises two optical carrier signals each carrying a transmitting microwave carrier frequency;
the second Mach-Zehnder modulator modulates the first signal into a fourth signal, wherein the fourth signal comprises two signals, each carrying a receiving microwave carrier frequency;
the dispersion module adjusts dispersion of one of the two signals that carry the receiving microwave carrier frequency, wherein after the dispersion adjustment, a relative phase difference between the two signals that carry the receiving microwave carrier frequency is 90 degrees;
the third Mach-Zehnder modulator mixes a received microwave signal carrying a baseband signal with the two signals that carry the receiving microwave carrier frequency after the dispersion adjustment to obtain a fifth signal, wherein the fifth signal comprises two signals carrying baseband signal spectrum components; and
the signal conversion module converts the fifth signal into a digital signal.

* * * * *